United States Patent
Li et al.

(10) Patent No.: US 11,334,225 B2
(45) Date of Patent: May 17, 2022

(54) APPLICATION ICON MOVING METHOD AND APPARATUS, TERMINAL AND STORAGE MEDIUM

(71) Applicant: BEIJING XIAOMI MOBILE SOFTWARE CO., LTD., Beijing (CN)

(72) Inventors: Jianming Li, Beijing (CN); Xi Wang, Beijing (CN); Chenbing Gu, Beijing (CN); Kairui Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/622,576

(22) PCT Filed: Jun. 16, 2017

(86) PCT No.: PCT/CN2017/088784
§ 371 (c)(1),
(2) Date: Dec. 13, 2019

(87) PCT Pub. No.: WO2018/227618
PCT Pub. Date: Dec. 20, 2018

(65) Prior Publication Data
US 2020/0183549 A1 Jun. 11, 2020

(51) Int. Cl.
*G06F 3/041* (2006.01)
*G06F 3/0483* (2013.01)
*G06F 3/04817* (2022.01)
(Continued)

(52) U.S. Cl.
CPC .......... *G06F 3/0483* (2013.01); *G06F 3/0416* (2013.01); *G06F 3/0482* (2013.01);
(Continued)

(58) Field of Classification Search
CPC .. G06F 3/0483; G06F 3/04146; G06F 3/0416; G06F 3/04817; G06F 3/0482; G06F 3/04883; H04M 1/72586
See application file for complete search history.

(56) References Cited

U.S. PATENT DOCUMENTS

2008/0215978 A1* 9/2008 Bamba ............... H04N 1/00411
715/713
2011/0252346 A1* 10/2011 Chaudhri ............ G06F 3/04886
715/765
(Continued)

FOREIGN PATENT DOCUMENTS

CN 101957718 A 1/2011
CN 104731472 A 6/2015
(Continued)

OTHER PUBLICATIONS

International search report of PCT application No. PCT/CN2017/088784 dated Jan. 29, 2018.
(Continued)

*Primary Examiner* — Towfiq Elahi
(74) *Attorney, Agent, or Firm* — Syncoda LLC; Feng Ma

(57) ABSTRACT

An application icon moving method includes: receiving an application icon moving instruction triggered by a user in a first area of a display interface of a terminal; displaying an application icon selection menu on the display interface based on the application icon moving instruction, wherein the application icon selection menu includes icon symbols of all applications installed on the terminal; receiving a selection instruction for an icon symbol of a specified application in the application icon selection menu from the user; and moving the specified application icon to the first area based on the selection instruction.

14 Claims, 15 Drawing Sheets

(51) Int. Cl.
*G06F 3/0482* (2013.01)
*G06F 3/04883* (2022.01)
*H04M 1/72472* (2021.01)

(52) U.S. Cl.
CPC ...... *G06F 3/04146* (2019.05); *G06F 3/04817* (2013.01); *G06F 3/04883* (2013.01); *H04M 1/72472* (2021.01)

(56) References Cited

U.S. PATENT DOCUMENTS

| | | | |
|---|---|---|---|
| 2014/0258926 A1* | 9/2014 | Min | G06F 3/0482 715/808 |
| 2016/0259413 A1* | 9/2016 | Anzures | H04L 67/32 |
| 2016/0259859 A1* | 9/2016 | Sathish | G06F 16/335 |
| 2016/0328123 A1 | 11/2016 | Toda et al. | |
| 2017/0017355 A1* | 1/2017 | Lim | G06F 3/0488 |
| 2017/0017451 A1* | 1/2017 | Sathyanarayana Raghu | H04B 1/385 |

FOREIGN PATENT DOCUMENTS

| | | |
|---|---|---|
| CN | 105589621 A | 5/2016 |
| CN | 105607801 A | 5/2016 |
| CN | 105718141 A | 6/2016 |
| CN | 106354373 A | 1/2017 |
| CN | 106775191 A | 5/2017 |
| EP | 1174787 A2 | 1/2002 |
| EP | 2713261 A2 | 4/2014 |

OTHER PUBLICATIONS

First office action of Chinese application No. 201780000462.5 dated Jan. 10, 2020.
Extended European search report of counterpart EP application No. 17913237.8 dated May 26, 2020.
Second office action of counterpart Chinese application No. 201780000462.5 dated Jun. 22, 2020.

* cited by examiner

APPLICATION ICON MOVING METHOD AND APPARATUS, TERMINAL AND STORAGE MEDIUM

CROSS-REFERENCE TO RELATED APPLICATION

This application is a national stage of International Application No. PCT/CN2017/088784 filed on Jun. 16, 2017, the disclosure of which is hereby incorporated by reference in its entirety.

TECHNICAL FIELD

The present disclosure relates to the field of electronic technology, and in particular to an application icon moving method and apparatus, a terminal and a storage medium.

BACKGROUND

With the popularization of smartphones, application software of mobile phones provides much convenience for users' life. Users can download a variety of application software through the mobile phones according to their individual needs. The application software is listed in different pages of user interfaces of the mobile phones. The users can also discretionarily adjust the locations of icons of the application software on the user interfaces according to personal habits or preferences. The icon of the application software is abbreviated as an application icon.

In the related art, a user who wants to move an application icon across pages on a user interface needs to first select and long-press the application icon to be moved on a screen, and then place it in an area at the lower portion of the user interface. This area is a fixed area in the user interface and does not move as the pages change. By flipping the pages, the user finds a target location where the application icon is to be placed, and then moves the application icon placed in the area at the lower portion of the user interface to the target location to complete one location change of the application icon.

However, in the above-mentioned application icon moving method, a terminal may needs to flip the pages more than once during movement of the application icon across pages, which results in complicated operations and relatively lower efficiency in moving the application icon.

SUMMARY

In order to solve the problems in the prior art, embodiments of the present disclosure provide an application icon moving method and apparatus, a terminal and a storage medium. The technical solutions are as below.

According to a first aspect of the embodiments of the present disclosure, there is provided an application icon moving method, comprising:

receiving an application icon moving instruction triggered by a user in a first area of a display interface of a terminal;

displaying an application icon selection menu on the display interface based on the application icon moving instruction, wherein the application icon selection menu comprises icon symbols of all applications installed on the terminal;

receiving a selection instruction for an icon symbol of a certain application in the application icon selection menu from the user; and moving the certain application icon to the first area based on the selection instruction.

Optionally, said displaying an application icon selection menu on the display interface comprises:

adjusting display sizes of the icon symbols of the application icons in the application icon selection menu based on a size of the display interface such that the icon symbols of all the applications installed on the terminal are displayed on the display interface.

Optionally, said displaying an application icon selection menu on the display interface comprises:

comparing an overall size m of the icon symbols of all the applications installed on the terminal with a size t of a reference sub-menu when a display size of the icon symbol of each application is set as a preset visual size, wherein the size of the reference sub-menu is smaller than or equal to a size of the display interface, and the preset visual size is smaller than a size of the application icon;

establishing the application icon selection menu when the overall size m meets the following condition: $n*t < m \leq (n+1)*t$, wherein the application icon selection menu comprises n+1 sub-menus, the size of each sub-menu is equal to the size of the reference sub-menu, the icon symbols of all the applications installed on the terminal are sequentially arranged in the n+1 sub-menus, and then is an integer more than 0; and displaying the first sub-menu in the application icon selection menus on the display interface, and switching the sub-menu displayed on the display interface after receiving a sub-menu switching instruction.

Optionally, said moving the certain application icon to the first area based on the selection instruction comprises:

detecting whether an application icon exists in the first area based on the selection instruction;

moving the certain application icon to the first area when no application icon does not exist in the first area; and when an application icon exists in the first area, moving the application icon in the first area to an area after the first area where no application icons exists, and moving the certain application icon to the first area; or sequentially moving the application icons existing in the first area and the area after the first area backwards and moving the certain application icon to the first area.

Optionally, the method further comprises:

displaying sort triggering information after displaying the application icon selection menu, wherein the sort triggering information comprises at least two sort order options;

receiving a sort order selection instruction triggered by a selection operation of a user on a certain sort order option;

sorting icon symbols of applications in the application icon selection menu based on a sort order corresponding to the certain sort order option; and displaying the sorted icon symbols of the applications in the application icon selection menu.

Optionally, the icon symbol of the application is a thumbnail of the application icon or an application name corresponding to the application icon.

Optionally, the application icon moving instruction is an instruction triggered by a long-press operation on the first area, and the long-press operation is a press with a touch duration longer than a preset duration; or the application icon moving instruction is an instruction triggered by a force touch operation on the first area, and the force touch operation is a touch with a pressure greater than a preset pressure.

According to a second aspect of the embodiments of the present disclosure, there is provided an application icon moving apparatus, comprising:

a first receiving module configured to receive an application icon moving instruction triggered by a user in a first area of a display interface of a terminal;

a first displaying module configured to display an application icon selection menu on the display interface based on the application icon moving instruction, wherein the application icon selection menu comprises icon symbols of all applications installed on the terminal;

a second receiving module configured to receive a selection instruction for an icon symbol of a certain application in the application icon selection menu from the user; and a moving module configured to move the certain application icon to the first area based on the selection instruction.

Optionally, the first displaying module is configured to:

adjust display sizes of the icon symbols of the applications in the application icon selection menu based on a size of the display interface such that the icon symbols of all the applications installed on the terminal are displayed on the display interface.

Optionally, the first displaying module is configured to:

compare an overall size m of the icon symbols of all the applications installed on the terminal with a size t of a reference sub-menu when a display size of the icon symbol of each application is set as a preset visual size, wherein the size of the reference sub-menu is smaller than or equal to a size of the display interface, and the preset visual size is smaller than a size of the application icon;

establish the application icon selection menu when the overall size m meets the following condition: $n*t<m\leq(n+1)*t$, wherein the application icon selection menu comprises n+1 sub-menus, the size of each sub-menu is equal to the size of the reference sub-menu, the icon symbols of all the applications installed on the terminal are sequentially arranged in the n+1 sub-menus, and then is an integer more than 0; and display the first sub-menu in the application icon selection menus on the display interface, and switch the sub-menu displayed on the display interface after receiving a sub-menu switching instruction.

Optionally, the moving module is configured to:

detect whether an application icon exists in the first area based on the selection instruction;

move the certain application icon to the first area when no application icon does not exist in the first area; and when an application icon exists in the first area, move the application icon in the first area to an area after the first area where no application icons exists, and moving the certain application icon to the first area; or sequentially move the application icons existing in the first area and the area after the first area backwards and moving the certain application icon to the first area.

Optionally, the apparatus further comprises:

a second displaying module configured to display sort triggering information after displaying the application icon selection menu, wherein the sort triggering information comprises at least two sort order options;

a third receiving module configured to receive a sort order selection instruction triggered by a selection operation of a user on a certain sort order option;

a sorting module configured to sort icon symbols of applications in the application icon selection menu based on a sort order corresponding to the certain sort order option; and a third displaying module configured to display the sorted icon symbols of the applications in the application icon selection menu.

Optionally, the icon symbol of the application is a thumbnail of the application icon or an application name corresponding to the application icon.

Optionally, the application icon moving instruction is an instruction triggered by a long-press operation on the first area, and the long-press operation is a press with a touch duration longer than a preset duration; or the application icon moving instruction is an instruction triggered by a force touch operation on the first area, and the force touch operation is a touch with a pressure greater than a preset pressure.

According to a third aspect of the embodiments of the present disclosure, there is provided a terminal, comprising:

a processor; and a memory configured to store an instruction executable by the processor;

wherein the processor is configured to:

receive an application icon moving instruction triggered by a user in a first area of a display interface of a terminal;

display an application icon selection menu on the display interface based on the application icon moving instruction, wherein the application icon selection menu comprises icon symbols of all applications installed on the terminal;

receive a selection instruction for an icon symbol of a certain application in the application icon selection menu from the user; and move the certain application icon to the first area based on the selection instruction.

According to a fourth aspect of the embodiments of the present disclosure, there is provided a storage medium, wherein a terminal is capable of executing any of the application icon moving methods in the first aspect when an instruction in the storage medium is executed by a processor of the terminal.

The technical solutions provided by the embodiments of the present disclosure may include the following beneficial effects.

According to the application icon moving method and apparatus, the terminal and the storage medium, provided by the embodiments of the present disclosure, the terminal displays the application icon selection menu on the display interface after receiving the application icon moving instruction triggered by the user in the first area of the display interface of the terminal, and moves the certain application icon to the first area after receiving the selection instruction for the icon symbol of the certain application in the application icon selection menu from the user. Through a selection operation on the application icon selection menu, page-flipping actions are reduced and the operation complexity is simplified. Thus, the efficiency in moving the application icon is improved.

It is to be understood that both the foregoing general description and the following detailed description are exemplary and explanatory only and are intended to limit the present disclosure.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary

The accompanying drawings, which are incorporated herein and constitute part of the description, illustrate embodiments consistent with the present disclosure and, together with the description, serve to explain the principles of the present disclosure.

DETAILED DESCRIPTION

In order to describe the principles, technical solutions and advantages in the embodiments of the present more clearly, the present disclosure will be described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Figure 1:
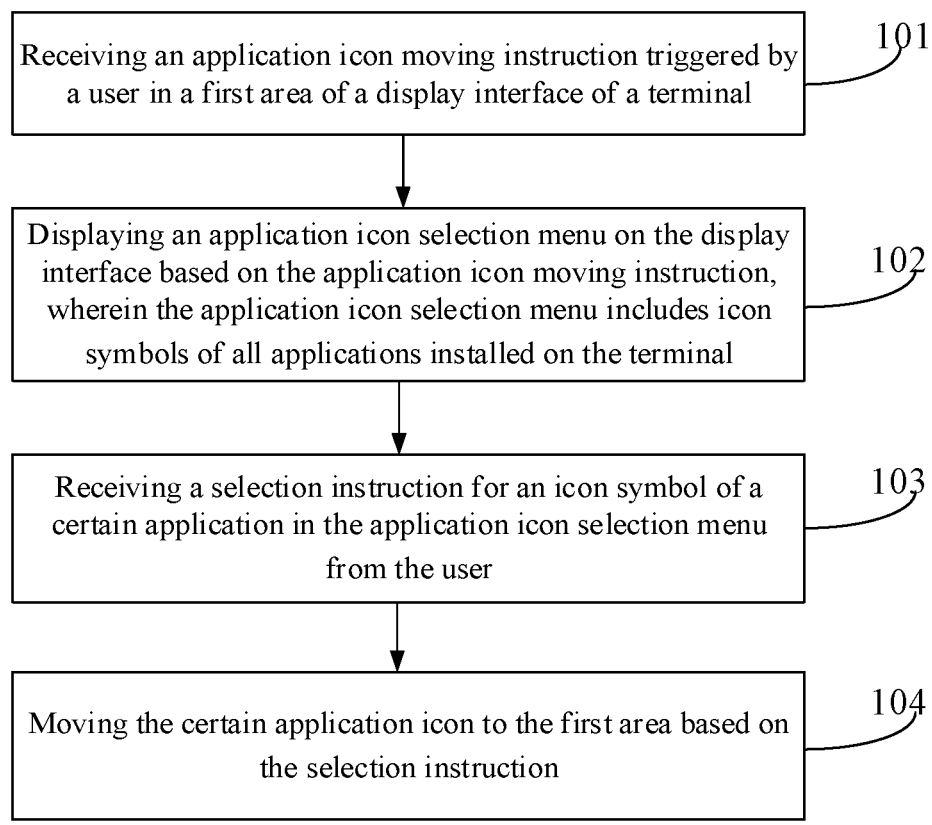
FIG. 1 is a flow diagram of an application icon moving method in accordance with an exemplary embodiment.

FIG. 1 is a flow diagram of an application icon moving method in accordance with an exemplary embodiment. As shown in FIG. 1, the application icon moving method includes:

step 101: receiving an application icon moving instruction triggered by a user in a first area of a display interface of a terminal;

step 102: displaying an application icon selection menu on the display interface based on the application icon moving instruction, wherein the application icon selection menu includes icon symbols of all applications installed on the terminal;

step 103: receiving a selection instruction for an icon symbol of a certain application in the application icon selection menu from the user; and step 104: moving the certain application icon to the first area based on the selection instruction.

In summary, according to the application icon moving method provided by the present embodiment, the terminal displays the application icon selection menu on the display interface after receiving the application icon moving instruction triggered by the user in the first area of the display interface of the terminal, and moves the certain application icon to the first area after receiving the selection instruction for the icon symbol of the certain application in the application icon selection menu from the user. Through a selection operation on the application icon selection menu, page-flipping actions are reduced and the operation complexity is simplified. Thus, the efficiency in moving the application icon is improved.

Figure 2A:
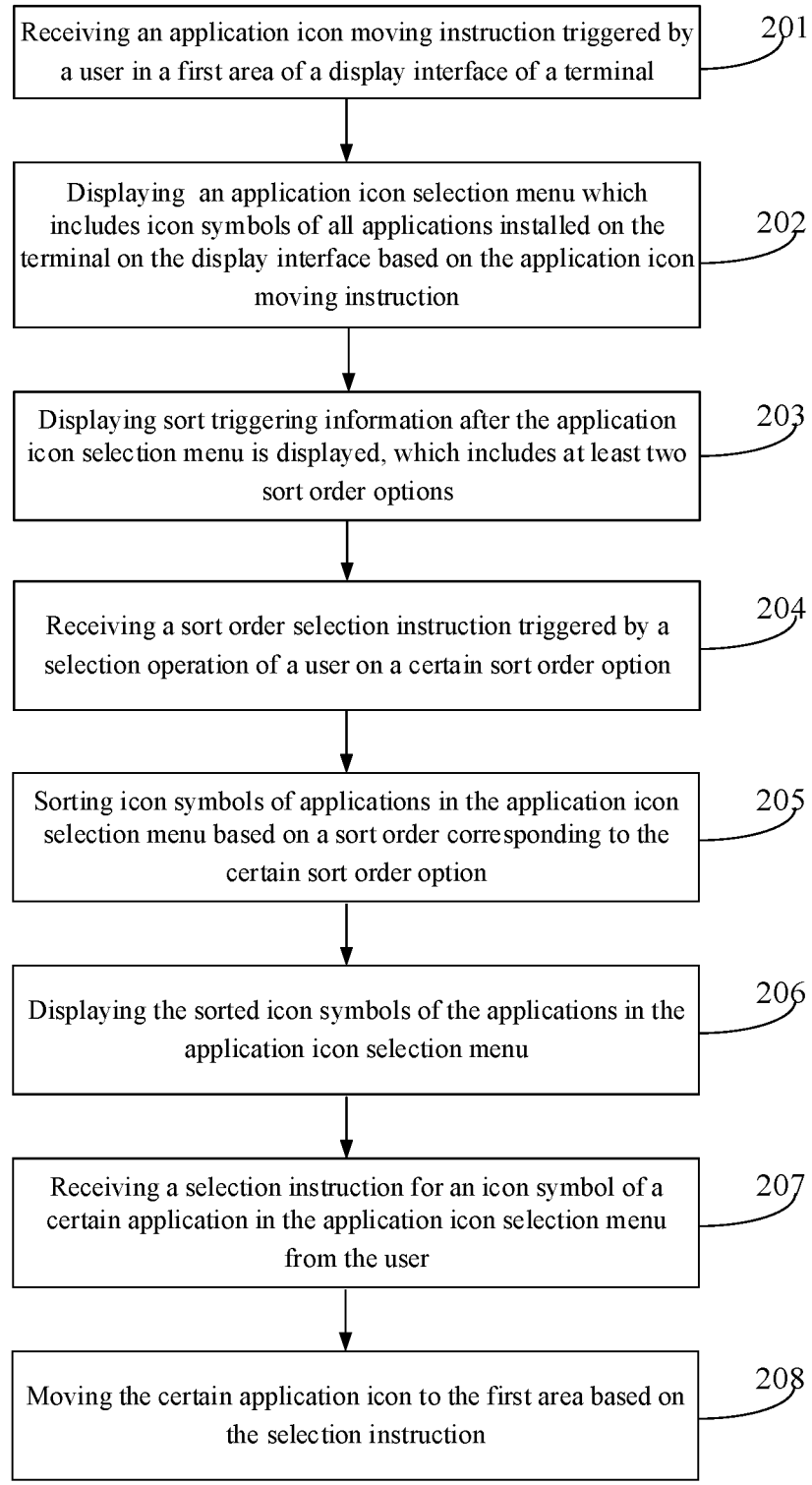
FIG. 2A is a flow diagram of anther application icon moving method in accordance with an exemplary embodiment.

FIG. 2A is a flow diagram of another application icon moving method in accordance with an exemplary embodiment. As shown in FIG. 2A, the application icon moving method includes the following steps.

In step 201, an application icon moving instruction triggered by a user in a first area of a display interface of a terminal is received.

In practice, the user who wants to move an application icon on a user interface can trigger the corresponding application icon moving instruction by various means. The application icon moving instruction is configured to instruct the terminal to move the application icon. By example, the present embodiment adopts the following two means as examples for explanation.

A first means is that the user triggers the application icon moving instruction by a long-press operation. That is, the application icon moving instruction is an instruction triggered by the long-press operation on the first area, and the long-press operation is a press with a touch duration longer than a preset duration. For example, the preset duration may be 1.5 s (seconds) or 2 s.

A second means is that the user triggers the application icon moving instruction by a force touch operation. That is, the application icon moving instruction is an instruction triggered by the force touch operation on the first area, and the force touch operation is a touch with a pressure greater than a preset pressure.

In step 202, an application icon selection menu is displayed on the display interface based on the application icon moving instruction. The application icon selection menu includes icon symbols of all applications installed on the terminal.

In the present embodiment, on the premise of guaranteeing that the application icon selection menu adapts to a size of the display interface, the application icon selection menu may be displayed in various ways. The present embodiment takes the following two display ways as examples for explanation.

A first display way is that the application icon selection menu is displayed on a single page of the display interface.

Display sizes of the icon symbols of the applications in the application icon selection menu are adjusted based on the size of the display interface such that the icon symbols of all the applications installed on the terminal are displayed on the display interface. The icon symbols of all the applications installed on the terminal may be sequentially arranged in a row direction (namely, a gate line scanning direction of a display screen of the terminal) and may also be sequentially arranged in a column direction (namely, a data line scanning direction of the display screen of the terminal).

Figure 2B:
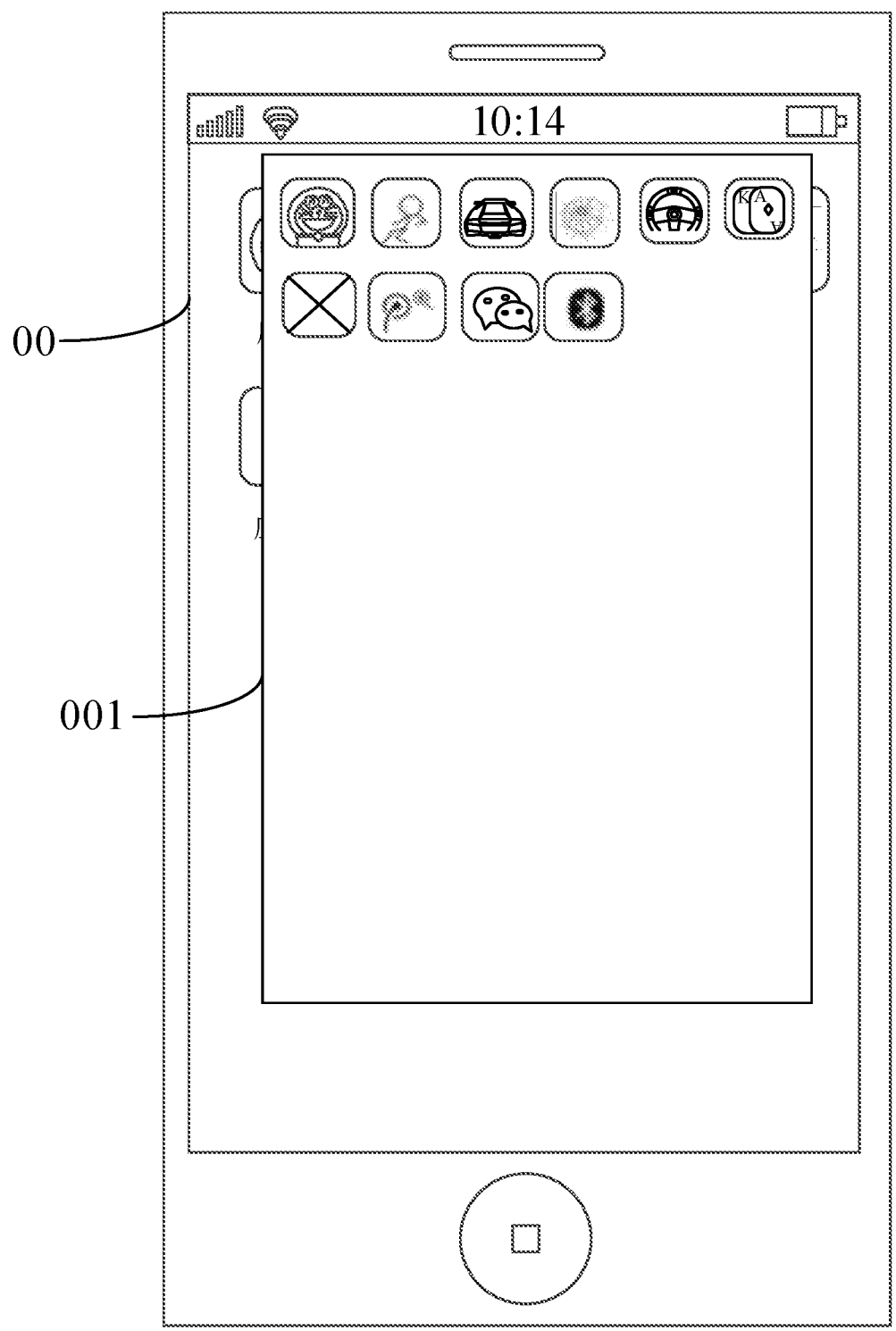
FIG. 2B is a schematic interface diagram illustrating an application icon selection menu displayed on a display interface of a terminal in accordance with an embodiment of the present disclosure.
Figure 2C:
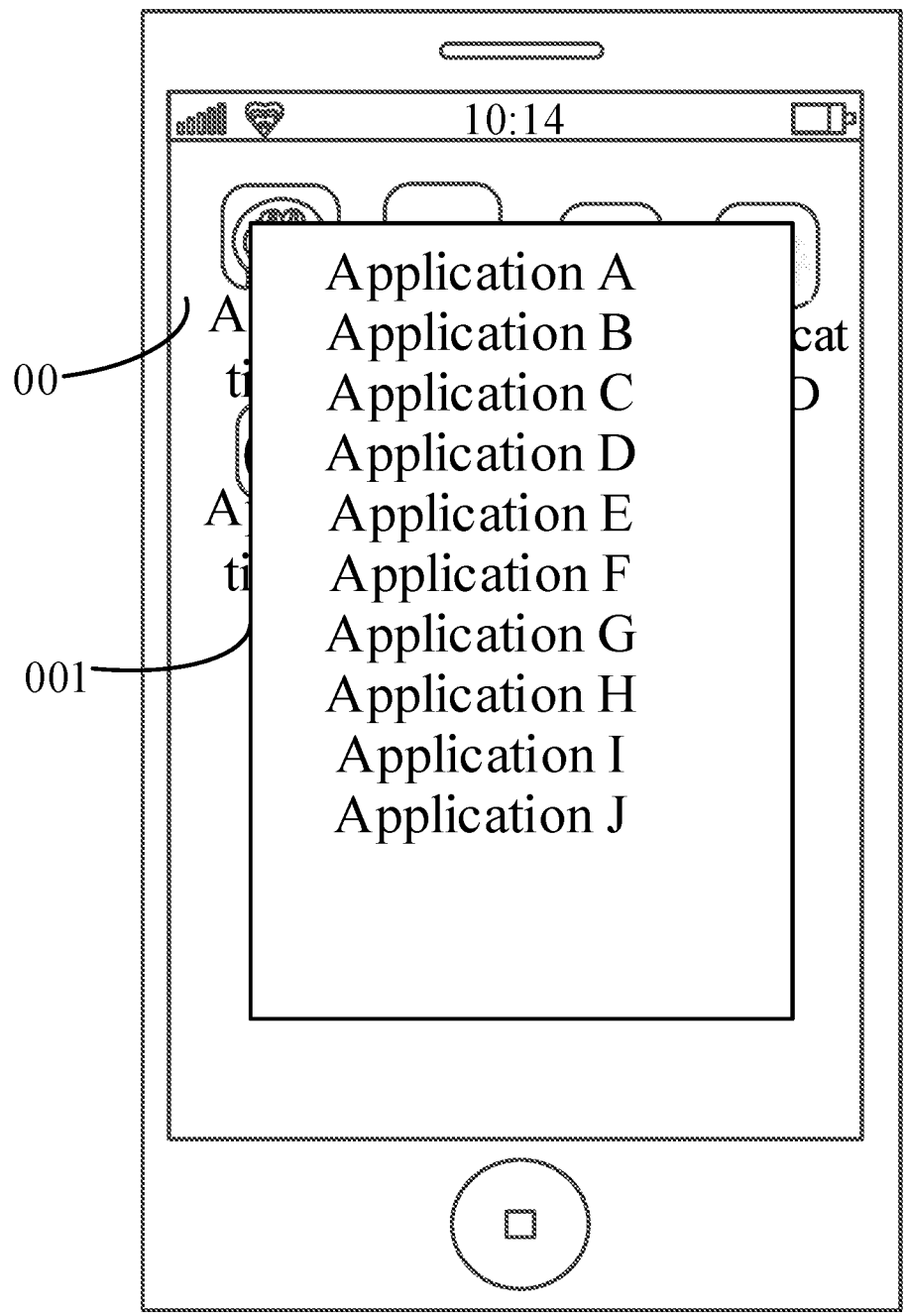
FIG. 2C is a schematic interface diagram illustrating another application icon selection menu displayed on a display interface of a terminal in accordance with an embodiment of the present disclosure.

By way of example, as shown in FIG. 2B and FIG. 2C, both of which are schematic interface diagrams illustrating an application icon selection menu 001 displayed on a display interface 00 of a terminal in accordance with an embodiment of the present disclosure. It is assumed that 10 application software (Apps) are installed in the terminal in FIG. 2B and FIG. 2C, correspondingly, the application icon selection menu may include icon symbols of 10 applications corresponding to the 10 application software. The icon symbol of the application is a thumbnail of the application icon or an application name corresponding to the application icon. FIG. 2B takes that the icon symbol of the application is the thumbnail of the application icon as an example for explanation, and the plurality of thumbnails in FIG. 2B is sequentially arranged in a row direction. FIG. 2C takes that the icon symbol of the application is the application name corresponding to the application icon as an example for explanation, and the plurality of application names in FIG. 2C is sequentially arranged in a column direction. In FIG. 2C, it is assumed that the application names corresponding to the application icons are respectively an application A to an application J. As shown in FIG. 2B and FIG. 2C, the icon symbols of the 10 applications may be arranged in the application icon selection menu based on an arranging order (or an installing order) of the application software in the terminal. The icon symbol of each application may be smaller than or equal to half of an original application icon, and for example, it may be one third of the original application icon.

Figure 2D:
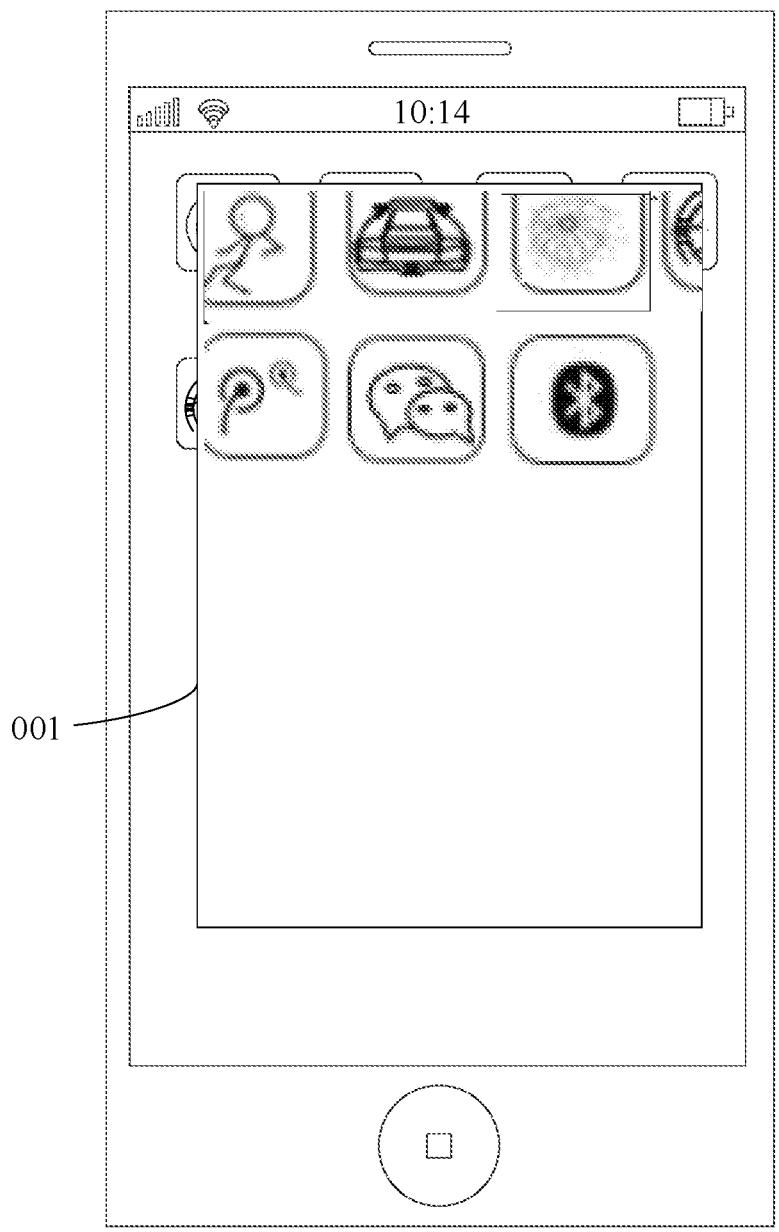
FIG. 2D is an effect diagram illustrating the zoomed-in application icon selection menu in FIG. 2B.
Figure 2E:
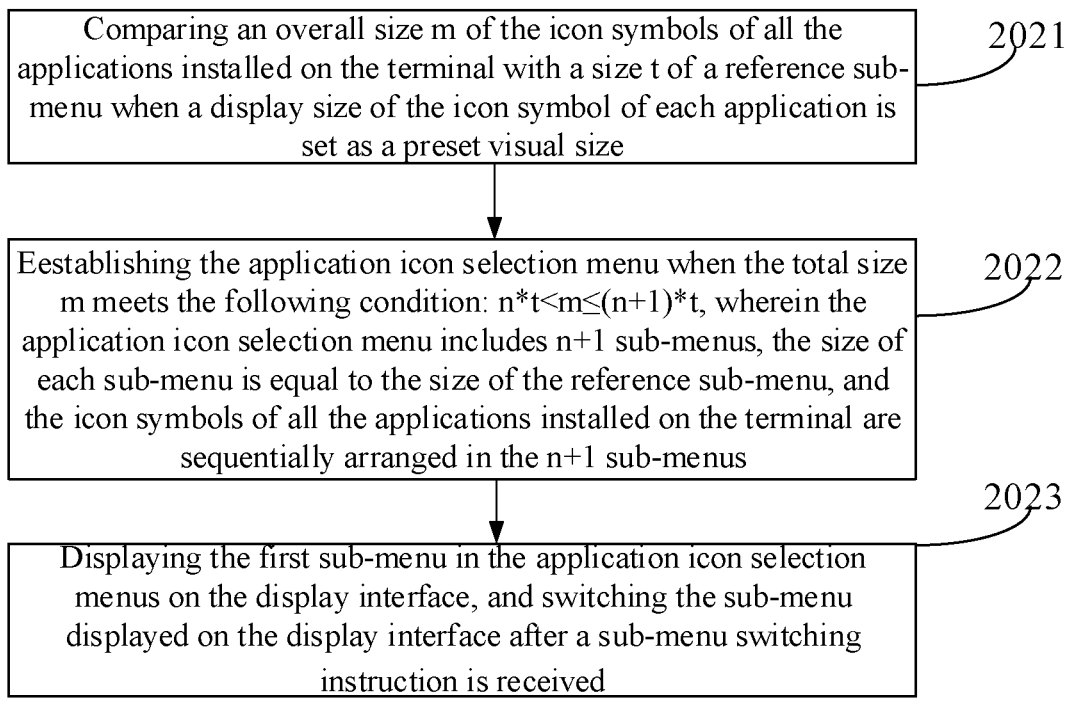
FIG. 2E is a flow diagram illustrating a method for displaying an application icon selection menu on a display interface in accordance with an embodiment of the present disclosure.

In order to prevent the icon symbol of the application in the application icon selection menu from being too small to cause inconvenience to the user, the application icon selection menu may have a zoom function. That is, when the terminal receives, through the application icon selection menu, a zoom-in instruction triggered by a zoom-in operation, the application icon selection menu is zoomed in correspondingly, and the icon symbol of the application on the application icon selection menu is zoomed in. At this time, the schematic interface diagram of the application icon selection menu may be as shown in FIG. 2D, which is an effect diagram illustrating the zoomed-in application icon selection menu 001 in FIG. 2B. Thus, convenience is brought for the user to view. The zoom-in operation may be an operation that two fingers touch the user interface and move outwards simultaneously. When the terminal receives, through the application icon selection menu, a zoom-out instruction triggered by a zoom-out operation, the application icon selection menu is zoomed out correspondingly. The zoom-out operation may be that two fingers touch the user interface and move inwards simultaneously.

When the application icon selection menu is displayed on the single page of the display interface, the user does not need to flip the page. Thus, the complexity in moving the application icon is effectively reduced. Further, the moving efficiency is improved.

In a second display way, the application icon selection menu is displayed based on the icon symbol of the application and a size of a reference sub-menu.

Optionally, the icon symbol of the application may be a thumbnail of the application icon or an application name corresponding to the application icon. By example, as shown in FIGS. 2 to 5, said displaying an application icon selection menu on the display interface includes the following steps.

In step 2021, an overall size m of the icon symbols of all the applications installed on the terminal is compared with a size t of a reference sub-menu when a display size of the icon symbol of each application is set as a preset visual size.

The size of the reference sub-menu is smaller than or equal to a size of the display interface. The preset visual size is smaller than a size of the application icon. The preset visual size is a preset size recognizable by naked eyes of the user and may be adjusted based on the size of the display interface. By example, the preset visual size may take the size of an original application icon as reference, for example, it may be half of the size of the original application icon; and the preset visual size may be a fixed size, and for example, an area corresponding to the preset visual size is a square area with the size of 1.5 cm (centimeter)*1.5 cm. When the display size of the icon symbol of each application is set as the preset visual size, the total size m of the icon symbols of all the applications installed on the terminal is the total size of the icon symbols of all the applications after the icon symbol of each application is displayed with the preset visual size. It is assumed that 10 application icons are installed in the terminal, the preset visual size is 1.5 cm*1.5 cm, and the size of the symbols of the 10 application icons is 1.5 cm*1.5 cm*10.

The size t of the reference sub-menu is an integral multiple of the preset visual size. For example, the area corresponding to the size t is a rectangular area with the size of 6*4*1.5 cm*1.5 cm.

In step 2022, the application icon selection menu is established when the total size m meets the following condition: $n*t<m\leq(n+1)*t$. The application icon selection menu includes n+1 sub-menus. The size of each sub-menu is equal to the size of the reference sub-menu. The icon symbols of all the applications installed on the terminal are sequentially arranged in the n+1 sub-menus.

By example, it is assumed that 100 application software is installed by the user on the terminal, specifications of the preset visual size may be set with reference to step 2021. That is, an area corresponding to the preset visual size of the icon symbol of each application is a square area with the size of 1.5 cm*1.5 cm. The total size m of the icon symbols of the 100 applications installed on the terminal is 100*1.5 cm*1.5 cm. In addition, referring to the specifications of the reference sub-menu in step 2021 for the size t of the reference sub-menu. That is, an area corresponding to the size t is a rectangular area with the size of 6*4*1.5 cm*1.5 cm.

The overall size m and the size t are substituted into the formula: $n*t<m\leq(n+1)*t$ to obtain $n*6*4*1.5$ cm*1.5 cm<100*1.5 cm*1.5 cm$\leq(n+1)*6*4*1.5$ cm*1.5 cm. Then, calculation is performed to obtain that n is 4. Then, the application icon selection menu including 5 sub-menus is established and configured to display the icon symbols of all the applications on the terminal using the preset visual size.

The first 4 sub-menus may display 96 icon symbols of the applications, of which the preset visual sizes are 1.5*1.5. The sub-menu on each page can display 24 icon symbols of the applications with the preset visual size. The 5$^{th}$ sub-menu can display 4 icon symbols of the applications with the preset visual size.

It should be noted that blank areas may be disposed at the upper and lower ends and/or the left and right ends of the reference sub-menu. No icon symbols of the applications are disposed in the blank areas. The blank areas of which the sizes are not included in the size of the reference sub-menu are for improving the visual impression of the user. That is, the size of the above reference sub-menu is obtained by subtracting the size of the blank area from the reference sub-menu if the blank areas are disposed on the reference sub-menu.

In step 2023, the first sub-menu in the application icon selection menus is displayed on the display interface. The sub-menu displayed on the display interface is switched after a sub-menu switching instruction is received.

Figure 2F:
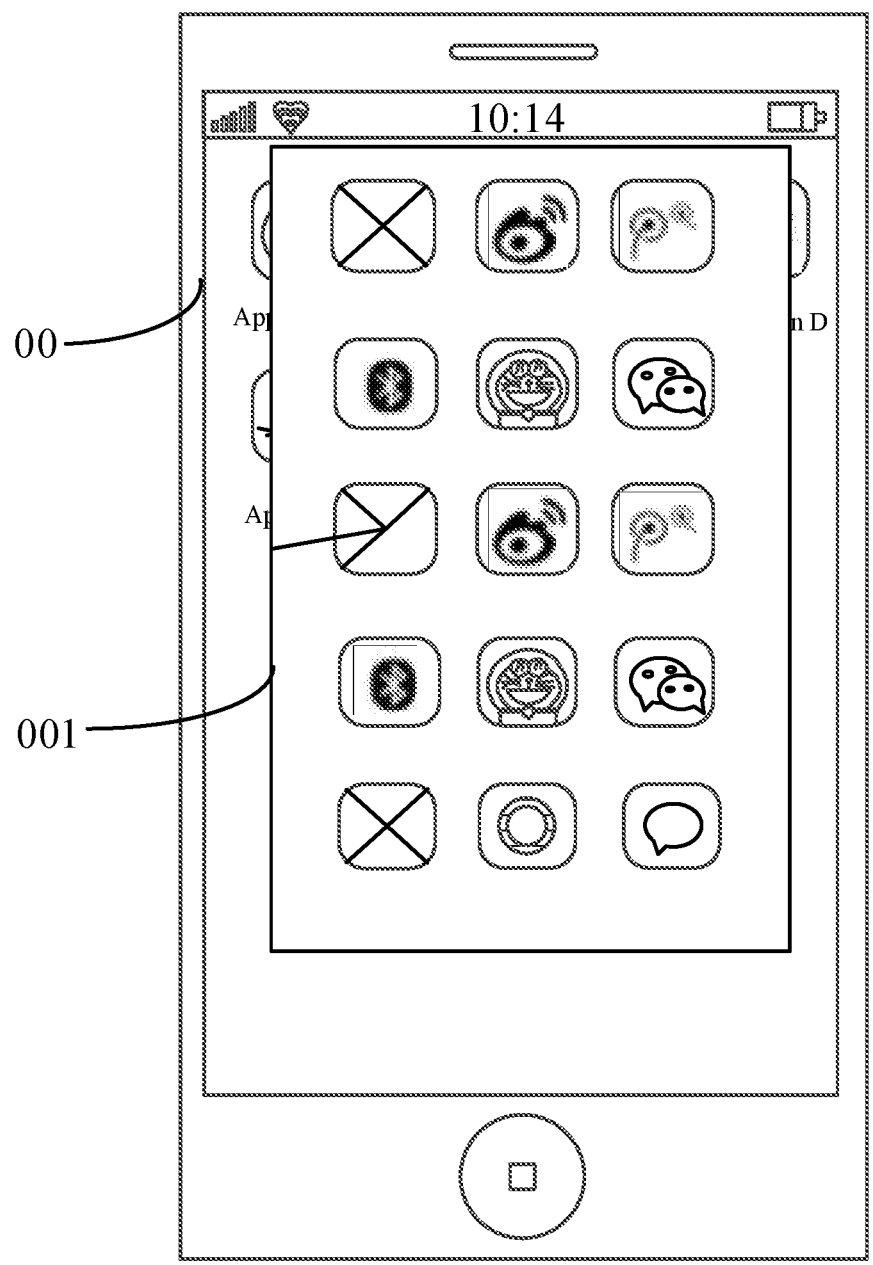
FIG. 2F is a schematic interface diagram illustrating the first sub-menu, displayed on a display interface, in the application icon selection menu in accordance with an embodiment of the present disclosure.
Figure 2G:
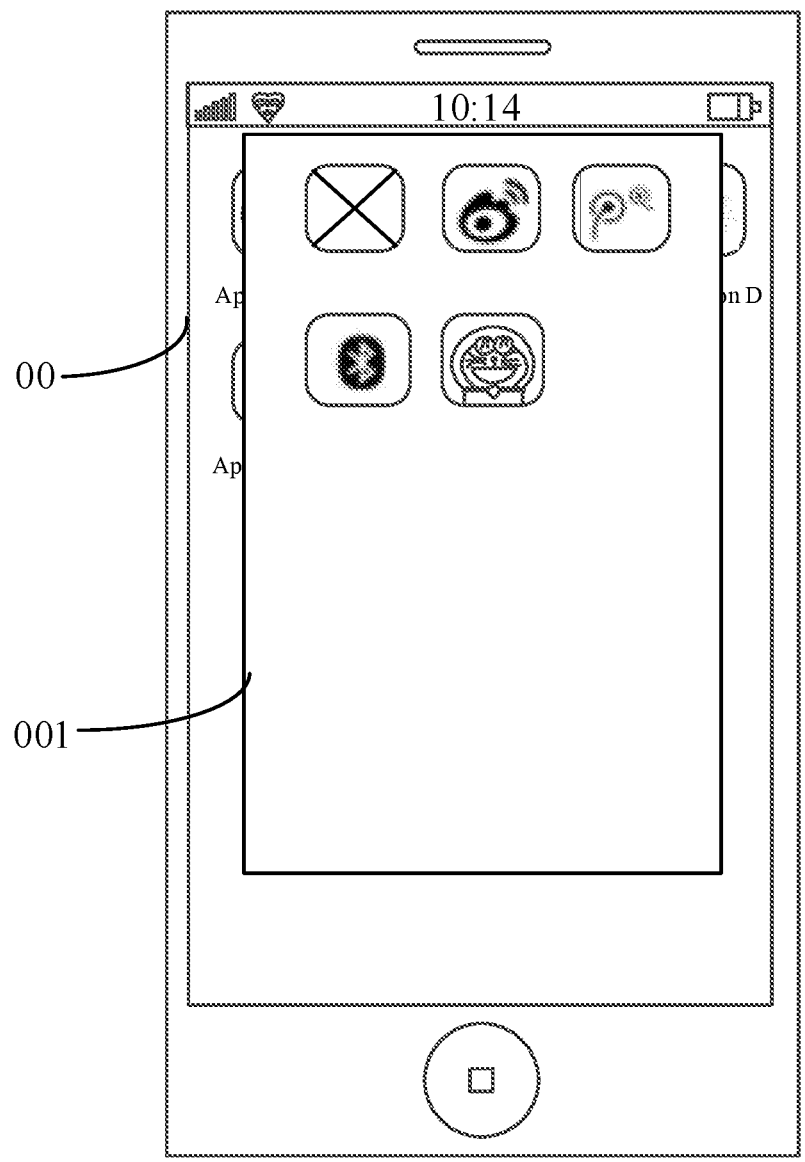
FIG. 2G is a schematic interface diagram illustrating a displayed sub-menu after receiving of a sub-menu switching instruction in accordance with an embodiment of the present disclosure.
Figure 2H:
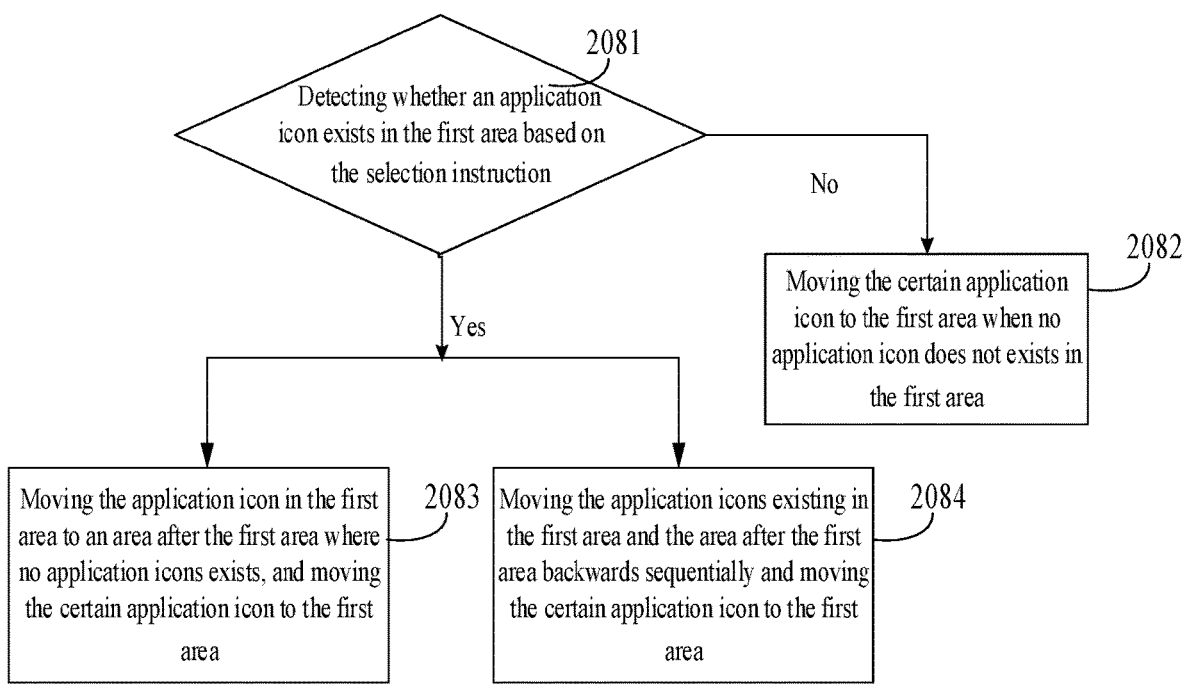
FIG. 2H is a flow diagram illustrating a method for moving a certain application icon to a first area based on a selection instruction in accordance with an embodiment of the present disclosure.

By example, it is assumed that 20 software applications are installed in the terminal, and correspondingly, the application icon selection menu may include the icon symbols of the 20 applications corresponding to the 20 application software. In FIG. 2F and FIG. 2G, it is assumed that the icon symbol of the application is a thumbnail of the application icon, and the icon symbols of the 20 applications are arranged in the sub-menu of the application icon selection menu based on a sort order of the application software in the terminal after the application icon selection menu is displayed. The application icon selection menu includes two sub-menus which are respectively sub-menus shown in FIG. 2F and FIG. 2G. FIG. 2F is schematic interface diagram illustrating the first sub-menu, displayed on a display interface, in the application icon selection menu in accordance with an embodiment of the present disclosure. FIG. 2G is a schematic interface diagram illustrating a displayed sub-menu after receiving of a sub-menu switching instruction in accordance with an embodiment of the present disclosure.

In practice, the application icon selection menu may also include a plurality of sub-menus. When the application icon selection menu includes the plurality of sub-menus, the sub-menus can be switched through a cross-slide operation. Each sub-menu is displayed in the form of a card. The cards corresponding to the plurality of menus are sequentially arranged transversely. The user slides left and right the card corresponding to a certain sub-menu that is displayed currently, such that the terminal can receive a corresponding slide switching operation triggered by the user and switch the cards in the corresponding positions based on the sliding direction of the user. For example, when a card corresponding to a certain sub-menu is at the left side of a card corresponding to another sub-menu, if the user slides from right to left, the card corresponding to another sub-menu at the right side of the card corresponding to the sub-menu slides to a current display interface.

It should be noted that when the application icon selection menu includes a plurality of sub-menus, the sub-menus can be switched through a longitudinal-slide operation. Each sub-menu is displayed in the form of a card. The cards corresponding to the plurality of menus are sequentially arranged longitudinally. The user slides up and down the card corresponding to a certain sub-menu that is displayed currently, such that the terminal can receive a corresponding slide switching operation triggered by the user and switch the cards in the corresponding positions based on the sliding direction of the user. For example, when a card corresponding to a certain sub-menu is above a card corresponding to another sub-menu, if the user slides from bottom to top, the card corresponding to another sub-menu below the card corresponding to the sub-menu slides to a current display interface.

In practice, the application icon selection menu may be displayed in the form of a card and others, for example, in the form of a transparent popup window, which will not be limited in the present embodiment. Through display in the form of the transparent popup window, the user can see background information on the display interface through the application icon selection menu, enriching the user's visual experience.

In step 203, sort triggering information is displayed after the application icon selection menu is displayed. The sort triggering information includes at least two sort order options.

After the icon symbols of all the applications on the terminal are arranged in the sub-menu of the application icon selection menu page by page in accordance with the sort order of the application software in the terminal, the display interface of the terminal can display the sort triggering information. The sort triggering information may be displayed in the form of a popup window or a button and includes at least two sort order options, which may include at least two of name, size, item type, use frequency, modification date, etc.

It should be noted that the sort triggering information may be directly displayed on the display interface or displayed after a specified triggering operation of the user is received. The specified triggering operation may be a touch operation on a specified button (for example, a home button) or a double-click operation, a single-click operation or a long-press operation on a specified area (for example, a blank area) of the application icon selection menu.

In step 204, a sort order selection instruction triggered by a selection operation of a user on a certain sort order option is received.

The user selects a certain sort order option from the two sort order options displayed on the display interface of the terminal according to individual demands. Correspondingly, the terminal receives a sort order selection instruction triggered by the selection operation of the user.

In step 205, icon symbols of applications in the application icon selection menu are sorted based on a sort order corresponding to the certain sort order option.

The terminal can, based on the sort order selection instruction triggered by the user, sort the icon symbols of all the applications on the terminal in accordance with a corresponding sort order.

For example, if the certain sort order option is a name option, the terminal performs sorting based on a name of the application software, usually based on the initial of the name. It is assumed that the name of the application software in the terminal includes "telephone" and "WeChat", it can be known based on the initial of "telephone" and "WeChat" that the icon symbol of the application corresponding to the application software "telephone" is arranged before the icon symbol of the application corresponding to the application soft "WeChat."

For example, if the certain sort order option is a use frequency option, the terminal sorts the icon symbols of the applications based on the use frequency of the application software within a preset time period. The end time of the preset time period is current time and its duration is a preset duration. For example, the preset duration may be 24 h. It is assumed that the name of the application software in the terminal includes "telephone" and "WeChat", and the application software "telephone" has been used for 3 times and the application software "WeChat" has been used for 10 times within 24 h prior to the current time, it can be known based on the use frequency of "telephone" and "WeChat" that the icon symbol of the application corresponding to the application software "WeChat" is arranged before the icon symbol of the application corresponding to the application software "Telephone."

In step 206, the sorted icon symbols of the applications are displayed in the application icon selection menu.

In steps 203 and 206, the user can adjust the sort order of the icon symbols of the applications based on the user's preferences or actual demands, such that the user can quickly find the application icon to be moved. The searching duration is shortened for the user. The efficiency in moving the application icon is improved.

In step 207, a selection instruction for an icon symbol of a certain application in the application icon selection menu is received from the user.

In practice, the user can select the icon symbol of the application corresponding to the application software which requires position adjustment, and trigger the terminal to receive the corresponding selection instruction. The selection operation may be implemented by a clicking operation.

In step 208, the certain application icon is moved to the first area based on the selection instruction.

By example, as shown in FIGS. 2 to 8, said moving the certain application icon to the first area based on the selection instruction may include the following steps.

In step 2081, whether an application icon exists in the first area is detected based on the selection instruction.

In step 2082, the certain application icon is moved to the first area when no application icon does not exist in the first area.

In step 2083, when an application icon exists in the first area, the application icon in the first area is moved to an area after the first area where no application icons exists, and the certain application icon is moved to the first area.

Figure 2I:
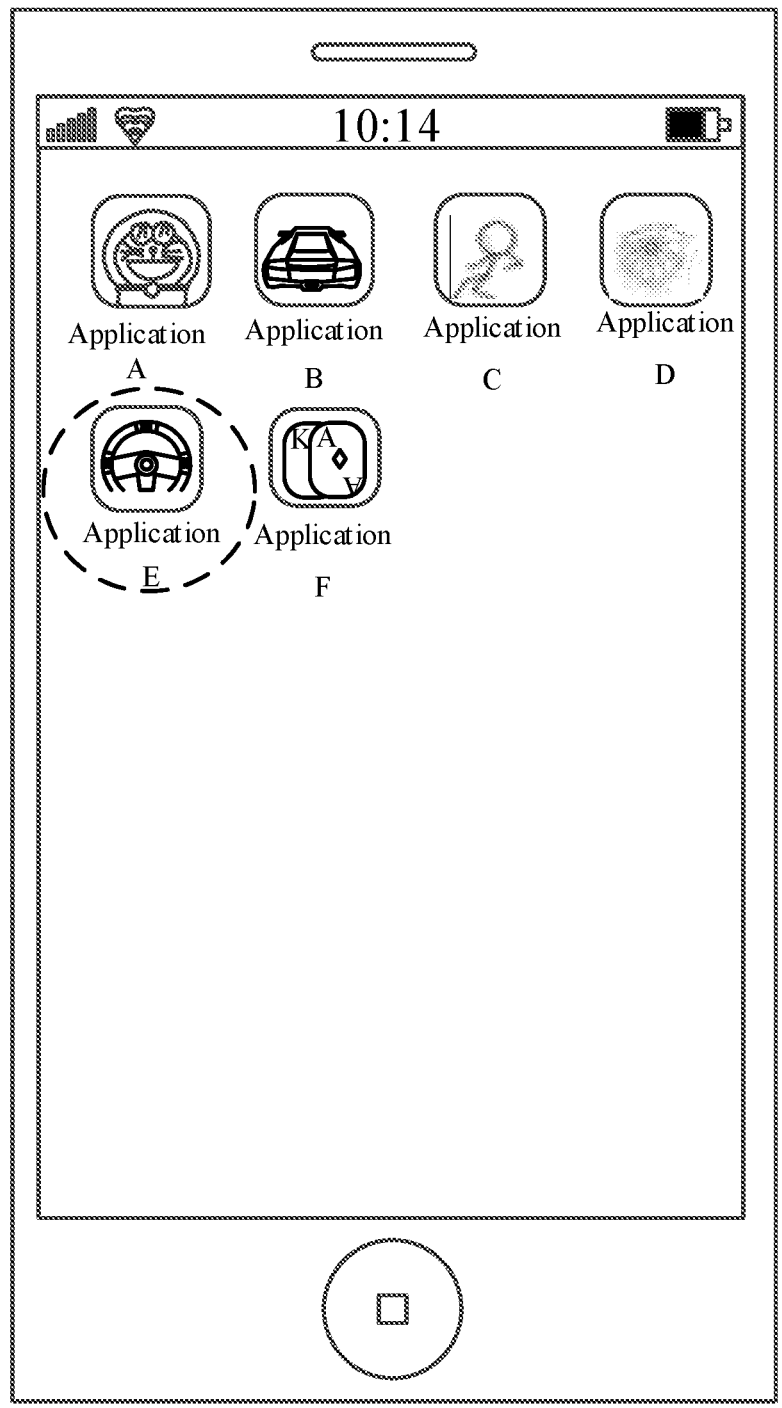
FIG. 2I is a schematic diagram of a display interface of a terminal in accordance with an embodiment of the present disclosure.
Figure 2J:
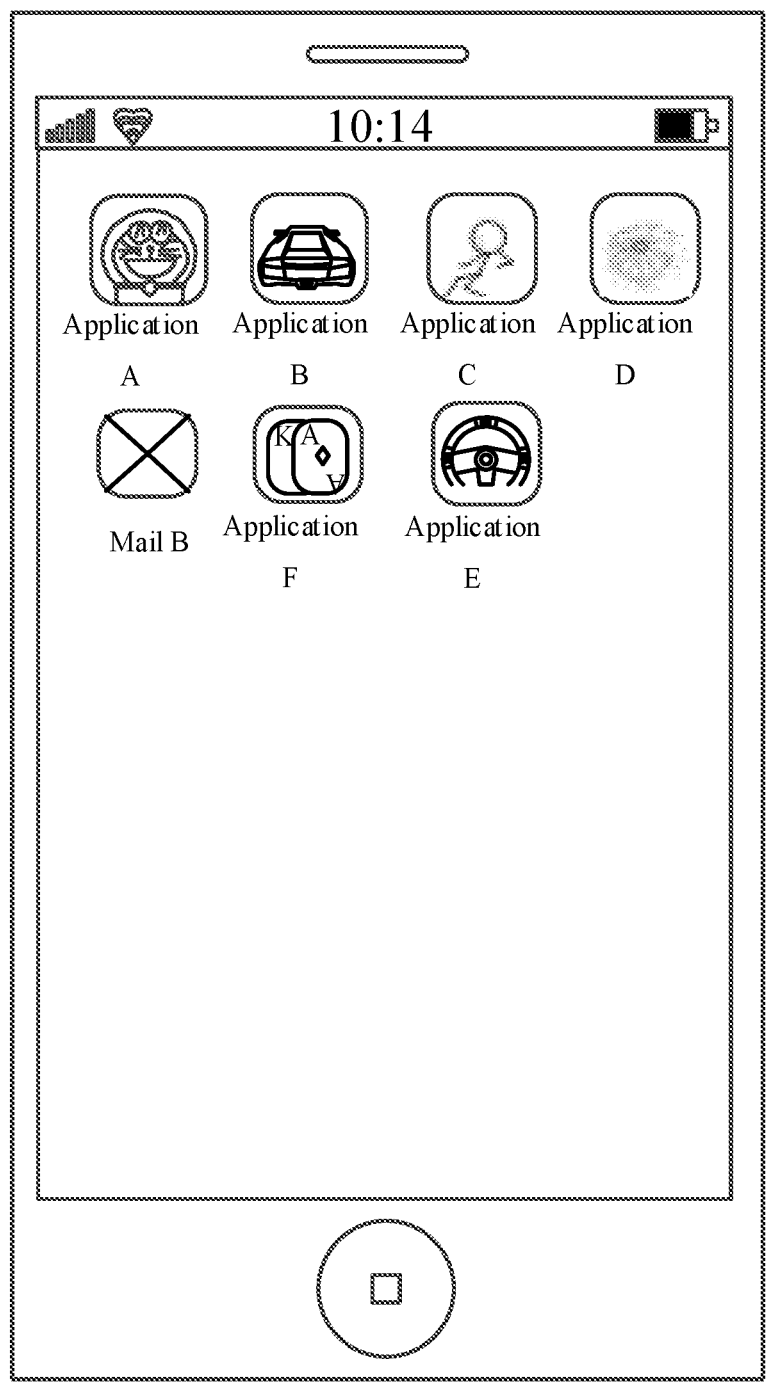
FIG. 2J is an effect diagram obtained after an application icon moving instruction is executed on the display interface shown in FIG. 2I in accordance with an embodiment of the present disclosure.

When the user wants to move application software with an application name of "mail B" to an area where application software with an application name of "application E" is located, the first area is the area where application software with the application name of "application E" is located. As shown in FIG. 2I, when the user triggers the corresponding application icon moving instruction in the area (the area in the dotted box of FIG. 2I) where the application software with the application name of "application E" is located, the terminal displays the application icon selection menu on the display interface based on the application icon moving instruction. At this time, after receiving the selection instruction, triggered by the user, for the application software with the application name of "mail B" on the application icon selection menu, the terminal moves the application software with the application name of "application E" to the area, where no application icons exists, after the first area, and moves the application software with the application name of "mail B" to the first area. The corresponding movement results may be as shown in FIG. 2J.

In step 2084, when the application icon exists in the first area, the application icons existing in the first area and the area after the first area are sequentially moved backwards and the certain application icon is moved to the first area.

Figure 2K:
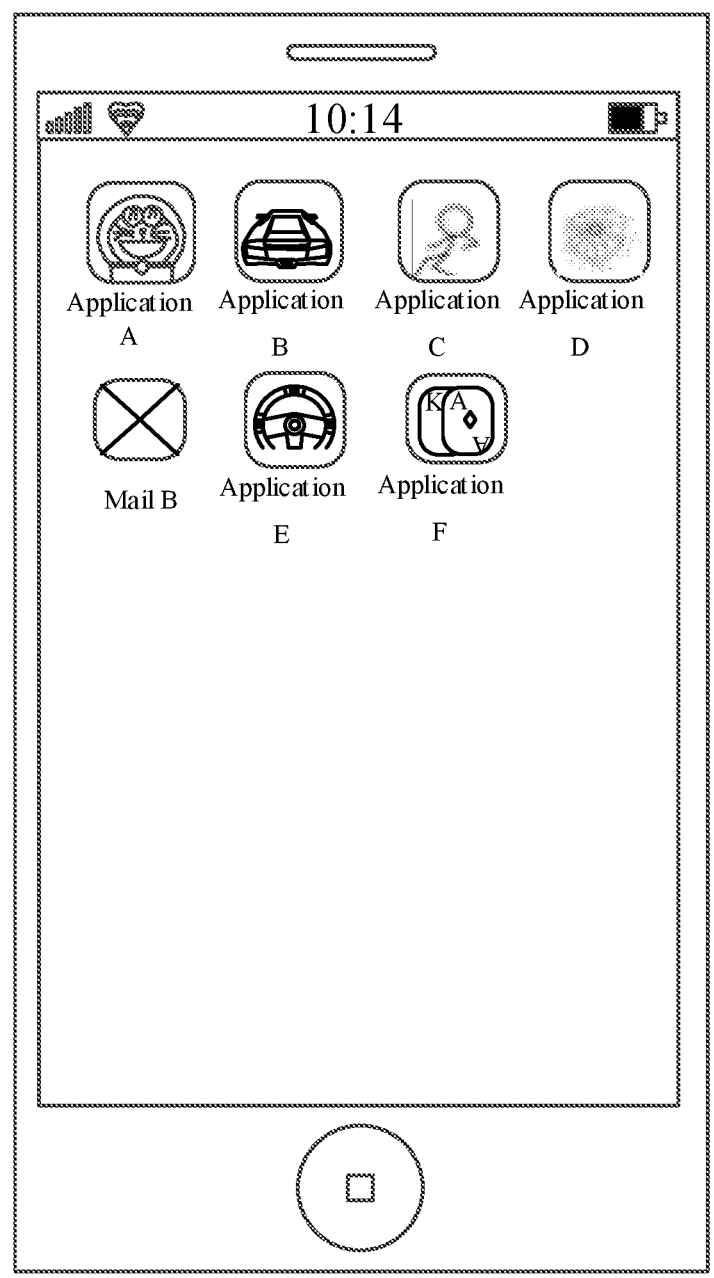
FIG. 2K is another effect diagram obtained after an application icon moving instruction is executed on the display interface shown in FIG. 2I in accordance with an embodiment of the present disclosure.

When the user wants to move application software with an application name of "mail B" to an area where application software with an application name of "application E" is located, the first area is the area where the application software with the application name of "application E" is located. As shown in FIG. 2I, when the user triggers the corresponding application icon moving instruction in the area (the area in the dotted box of FIG. 2I) where the application software with the application name of "application E" is located, the terminal displays the application icon selection menu on the display interface based on the application icon moving instruction. At this time, after receiving the selection instruction, triggered by the user, for the application software with the application name of "mail B" on the application icon selection menu, the terminal sequentially moves the application software with the application name of "application E" and application software with an application name of "application F" backwards by a distance of one application icon, and moves the application software with the application name of "mail B" to the first area. The corresponding movement results are as shown in FIG. 2K.

It should be noted that the sequence of the steps of the application icon moving method provided by the present embodiment may be appropriately adjusted, and the steps may also be correspondingly increased or decreased according to the situation. For example, steps 203-206 may not be performed. Any variation method that can be easily conceived by a technician familiar with this field of technology within the technical scope disclosed by the present disclosure shall be included into the protection scope of the present disclosure, and therefore will not be repeated.

In view of the above, according to the application icon moving method provided by the present embodiment, the terminal displays the application icon selection menu on the display interface after receiving the application icon moving instruction triggered by the user in the first area of the display interface of the terminal, and moves the certain application icon to the first area after receiving the selection instruction for the symbol of the certain application icon in the application icon selection menu from the user. Through the selection operation on the application icon selection menu, page-flipping actions are reduced and the operation complexity is simplified. Thus, the efficiency in moving the application icon is improved. When the application icon selection menu is displayed on the single page of the display interface, the user does not need to flip the page. Thus, the complexity in moving the application icon is effectively reduced. Further, the moving efficiency is improved.

Figure 3A:
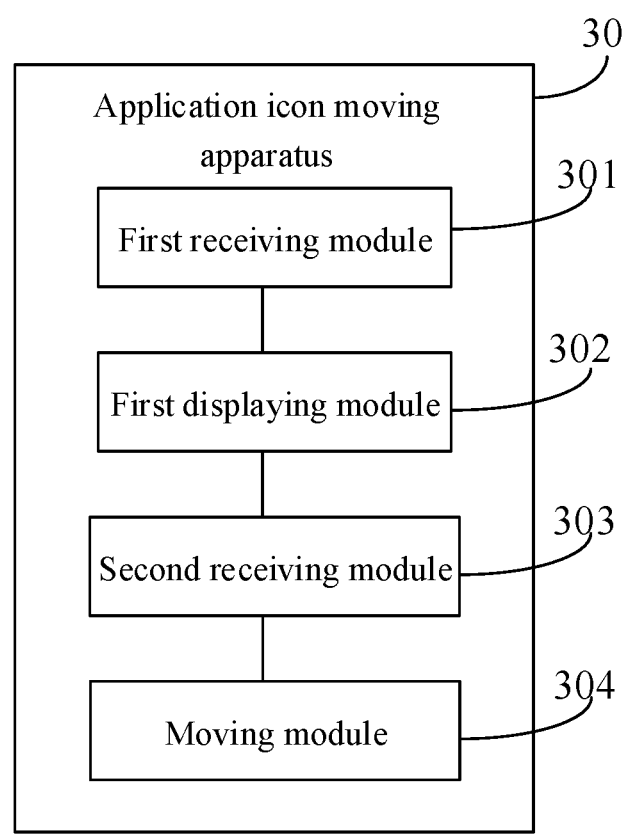
FIG. 3A is a block diagram of an application icon moving apparatus in accordance with an exemplary embodiment.

An embodiment of the present disclosure provides an application icon moving apparatus 30. As shown in FIG. 3A, the application icon moving apparatus includes:

a first receiving module 301, a first displaying module 302, a second receiving module 303 and a moving module 304.

The first receiving module 301 is configured to receive an application icon moving instruction triggered by a user in a first area of a display interface of a terminal.

The first displaying module 302 is configured to display an application icon selection menu on the display interface based on the application icon moving instruction. The application icon selection menu includes icon symbols of all applications installed on the terminal.

The second receiving module 303 is configured to receive a selection instruction for an icon symbol of a certain application in the application icon selection menu from the user.

The moving module 304 is configured to move the certain application icon to the first area based on the selection instruction.

In view of the above, according to the application icon moving apparatus provided by the present embodiment, the first displaying module displays the application icon selection menu on the display interface after the first receiving module receives the application icon moving instruction triggered by the user in the first area of the display interface of the terminal. The moving module moves the certain application icon to the first area after the second receiving module receives the selection instruction for the symbol of the certain application icon in the application icon selection menu from the user. Through a selection operation on the application icon selection menu, page-flipping actions are reduced and the operation complexity is simplified. Thus, the efficiency in moving the application icon is improved.

Optionally, the first displaying module 302 is configured to:

adjust display sizes of the icon symbols of the applications in the application icon selection menu based on a size of the display interface such that the icon symbols of all the applications installed on the terminal are displayed on the display interface.

Optionally, the first displaying module 302 is configured to:

compare an overall size m of the icon symbols of all the applications installed on the terminal with a size t of a reference sub-menu when a display size of the icon symbol of each application is set as a preset visual size, wherein the size of the reference sub-menu is smaller than or equal to a size of the display interface, and the preset visual size is smaller than a size of the application icon;

establish the application icon selection menu when the overall size m meets the following condition: $n*t<m\le(n+1)*t$, wherein the application icon selection menu includes n+1 sub-menus, the size of each sub-menu is equal to the size of the reference sub-menu, the icon symbols of all the applications installed on the terminal are sequentially arranged in the n+1 sub-menus, and the n is an integer more than 0; and display the first sub-menu in the application icon selection menus on the display interface, and switch the sub-menu displayed on the display interface after receiving a sub-menu switching instruction.

Optionally, the moving module 304 is configured to:

detect whether an application icon exists in the first area based on the selection instruction;

move the certain application icon to the first area when no application icon does not exist in the first area; and when an application icon exists in the first area, move the application icon in the first area to an area after the first area where no application icons exists, and move the certain application icon to the first area; or sequentially move the application icons existing in the first area and the area after the first area backwards and move the certain application icon to the first area.

Figure 3B:
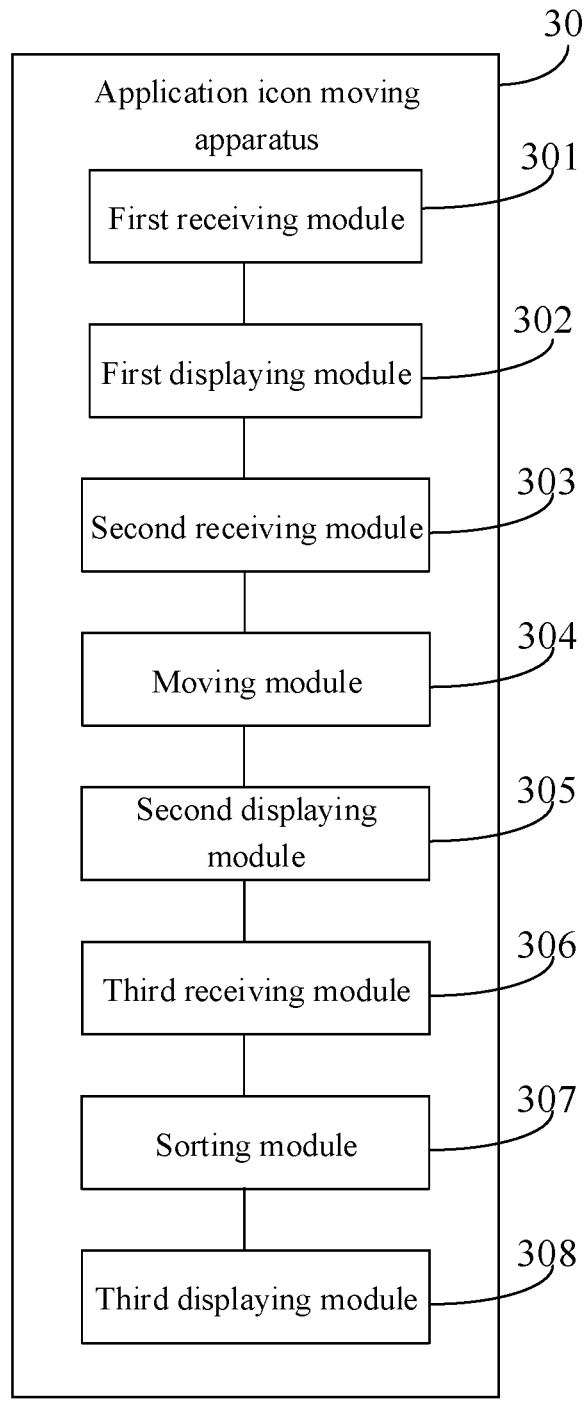
FIG. 3B is a block diagram of another application icon moving apparatus in accordance with an exemplary embodiment.

Optionally, an embodiment of the present disclosure provides an application icon moving apparatus 30. As shown in FIG. 3B, the application icon moving apparatus 30 includes:

a first receiving module 301, a first displaying module 302, a second receiving module 303, a moving module 304, a second displaying module 305, a third receiving module 306, a sorting module 307 and a third displaying module 308.

The first receiving module 301 is configured to receive an application icon moving instruction triggered by a user in a first area of a display interface of a terminal.

The first displaying module 302 is configured to display an application icon selection menu on the display interface based on the application icon moving instruction. The application icon selection menu includes icon symbols of all applications installed on the terminal.

The second receiving module 303 is configured to receive a selection instruction for an icon symbol of a certain application in the application icon selection menu from the user.

The moving module 304 is configured to move the certain application icon to the first area based on the selection instruction.

The second displaying module 305 is configured to display sort triggering information after displaying the application icon selection menu. The sort triggering information includes at least two sort order options.

The third receiving module 306 is configured to receive a sort order selection instruction triggered by a selection operation of the user on a certain sort order option.

The sorting module 307 is configured to sort icon symbols of applications in the application icon selection menu based on a sort order corresponding to the certain sort order option.

The third displaying module 308 is configured to display the sorted icon symbols of the applications in the application icon selection menu.

Optionally, the icon symbol of the application is a thumbnail of the application icon or an application name corresponding to the application icon.

Optionally, the application icon moving instruction is an instruction triggered by a long-press operation on the first area, and the long-press operation is a press with a touch duration longer than a preset duration; or the application icon moving instruction is an instruction triggered by a force touch operation on the first area, and the force touch operation is a touch with a pressure greater than a preset pressure.

In view of the above, according to the application icon moving apparatus, the first displaying module displays the application icon selection menu on the display interface after the first receiving module receives the application icon moving instruction triggered by the user in the first area of the display interface of the terminal. The moving module moves the certain application icon to the first area after the second receiving module receives the selection instruction for the symbol of the certain application icon in the application icon selection menu from the user. Through a selection operation on the application icon selection menu, page-flipping actions are reduced and the operation complexity is simplified. Thus, the efficiency in moving the application icon is improved. When the application icon selection menu is displayed on the single page of the display interface, the user does not need to flip the page. Thus, the complexity in moving the application icon is effectively reduced. Further, the moving efficiency is improved.

An embodiment of the present disclosure provides a terminal, including:

a processor; and a memory configured to store an instruction executable by the processor.

The processor is configured to execute the above-mentioned application icon moving method. By example, the processor may be configured to:

receive an application icon moving instruction triggered by a user in a first area of a display interface of a terminal;

display an application icon selection menu on the display interface based on the application icon moving instruction, wherein the application icon selection menu includes icon symbols of all applications installed on the terminal;

receive a selection instruction for an icon symbol of a certain application in the application icon selection menu from the user; and move the certain application icon to the first area based on the selection instruction.

An embodiment of the present disclosure provides a storage medium. A terminal is capable of executing the above-mentioned application icon moving method when an instruction in the storage medium is executed by a processor of the terminal.

Figure 4:
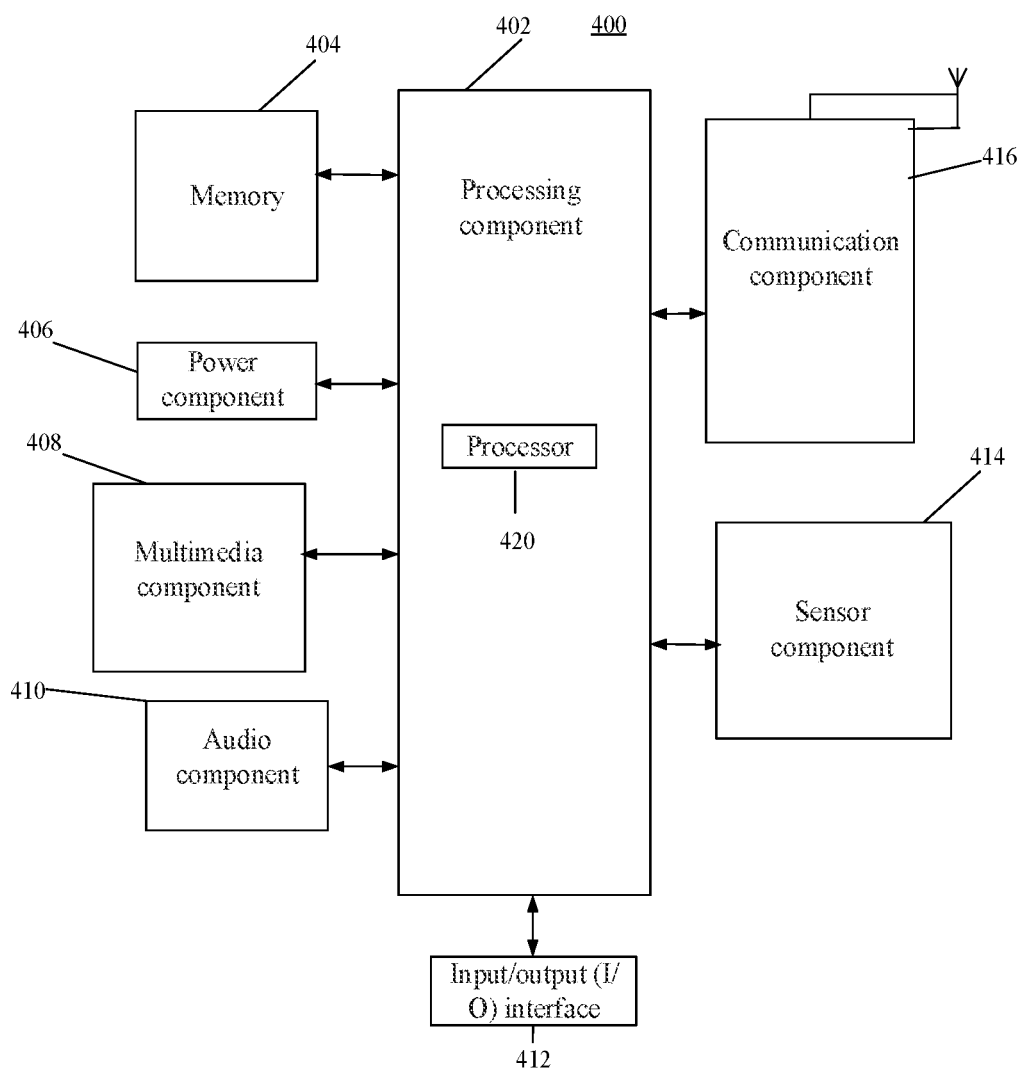
FIG. 4 is a block diagram of yet another application icon moving apparatus in accordance with an exemplary embodiment.

FIG. 4 is a block diagram of an application icon moving apparatus 400 in accordance with an exemplary embodiment. For example, the apparatus 400 may be a mobile phone, a computer, a digital broadcast terminal, a messaging apparatus, a gaming console, a tablet apparatus, a medical apparatus, a fitness equipment, a personal digital assistant, and the like.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls the overall operations of the apparatus 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, videos, etc. The memory 404 may be implemented by using any type of volatile or non-volatile memory apparatus, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power in the apparatus 400.

The multimedia component 408 includes a screen providing an output interface between the apparatus 400 and the user. In some embodiments, the screen may include a liquid crystal display (LCD) and a touch panel (TOP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 408 includes a front camera and/or a rear camera. The front camera and the rear camera may receive external multimedia data while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive external audio signals when the apparatus 400 is in an operation mode, such as a call mode, a recording mode, and a voice recognition mode. The received audio signal may be further stored in the memory 404 or transmitted via the communication component 416. In some embodiments, the audio component 410 further includes a speaker for outputting audio signals.

The I/O interface 412 provides an interface between the processing component 402 and peripheral interface modules, such as a keyboard, a click wheel, buttons, and the like. The buttons may include, but are not limited to, a home button, a volume button, a start button, and a lock button.

The sensor component 414 includes one or more sensors to provide status assessments of various aspects of the apparatus 400. For instance, the sensor component 414 may detect an on/off status of the apparatus 400, relative positioning of components, e.g., the display apparatus and the mini keyboard of the apparatus 400, and the sensor component 414 may also detect a position change of the apparatus 400 or a component of the apparatus 400, presence or absence of user contact with the apparatus 400, orientation or acceleration/deceleration of the apparatus 400, and temperature change of the apparatus 400. The sensor component 414 may include a proximity sensor configured to detect the presence of nearby objects without any physical contact. The sensor component 414 may also include a light sensor, such as a CMOS or CCD image sensor, used for imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other apparatuses. The apparatus 400 can access a wireless network based on a communication standard, such as Wi-Fi, 2G, or 3G, or a combination thereof. In an exemplary embodiment, the communication component 416 receives broadcast signals or broadcast associated information from an external broadcast management system via a broadcast channel. In an exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 400 may be implemented with one or more application specific integrated circuits (ASICs), digital signal processors (DSPs), digital signal processing device (DSPDs), programmable logic device (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 404 including instructions, executable by the processor 410 in the apparatus 400, for performing the above-described methods. For example, the non-transitory computer-readable storage medium may be a ROM, a RAM, a CD-ROM, a magnetic tape, a floppy disc, an optical data storage apparatus, and the like.

With respect to the apparatus of the above embodiment, the specific method of operation performed by each module has been described in details in the embodiment of the method, and the description thereof may not be described in details herein.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. An application icon moving method, comprising:
receiving an application icon moving instruction triggered by a user in a first area to which an application icon is to be moved, wherein the first area is an area having at most one application icon and located in one of a plurality of pages of a display interface of a terminal, and the application icon moving instruction is one of a long-press operation and a force touch operation;
displaying an application icon selection menu in a form of a transparent popup window on the display interface in response to the application icon moving instruction, so that all application icons in a page where the first area is located are displayed behind the application icon selection menu and icon symbols of all applications installed on the terminal are displayed in the application icon selection menu;
receiving a selection instruction for an icon symbol of a selected application in the application icon selection menu from the user; and
moving an application icon of the selected application to the first area in response to the selection instruction;
wherein said displaying an application icon selection menu on the display interface comprises:
comparing an overall size m of the icon symbols of all the application installed on the terminal with a size t of a reference sub-menu in response to that a display size of the icon symbol of each application is set as a preset visual size, wherein the size of the reference sub-menu is smaller than or equal to a size of the display interface, and the preset visual size is smaller than a size of the application icon;
establishing the application icon selection menu in response to that the overall size m meets the following condition: n*t≤m≤(n+1)*t, wherein the application icon selection menu comprises n+1 sub-menus, the size of each sub-menu is equal to the size of the reference sub-menu, the icon symbols of all the applications installed on the terminal are sequentially arranged in the n+1 sub-menus, and the n is an integer more than 0; and
displaying the first sub-menu in the application icon selection menus on the display interface, and switching the sub-menu displayed on the display interface after receiving a sub-menu switching instruction.

2. The method according to claim 1, wherein
said moving the specified application icon to the first area based on the selection instruction comprises:
detecting whether any application icon exists in the first area based on the selection instruction;
moving the specified application icon to the first area in response to that no application icon exists in the first area; and
in response to that an application icon exists in the first area, moving the application icon in the first area to an area after the first area where no application icon exists, and moving the specified application icon to the first area; or
sequentially moving the application icons existing in the first area and the area after the first area backwards and moving the specified application icon to the first area.

3. The method according to claim 1, further comprising:
displaying sort triggering information after displaying the application icon selection menu, wherein the sort triggering information comprises at least two sort order options;
receiving a sort order selection instruction triggered by a selection operation of a user on a specified sort order option;
sorting icon symbols of applications in the application icon selection menu based on a sort order corresponding to the specified sort order option; and
displaying the sorted icon symbols of the applications in the application icon selection menu.

4. The method according to claim 1, wherein the icon symbol of the application is a thumbnail of the application icon or an application name corresponding to the application icon.

5. The method according to claim 1, wherein
the long-press operation is a press with a duration longer than a preset duration; and
the force touch operation is a touch with a pressure greater than a preset pressure.

6. A terminal, comprising:
a processor; and
memory storing an instruction executable by the processor to
receive an application icon moving instruction triggered by a user in a first area to which an application icon is to be moved, wherein the first area is an area having at most one application icon and located in one of a plurality of pages of a display interface of a terminal, and the application icon moving instruction is one of a long-press operation and a force touch operation;
displaying an application icon selection menu in a form of a transparent popup window on the display interface in response to the application icon moving instruction, so that all application icons in a page where the first area is located are displayed behind the application icon selection menu and icon symbols of all applications installed on the terminal are displayed in the application icon selection menu;
receiving a selection instruction for an icon symbol of a selected application in the application icon selection menu from the user; and
moving an application icon of the selected application to the first area in response to the selection instruction;
wherein the displaying an application icon selection menu on the display interface comprises:

comparing an overall size m of the symbols of all the icon applications installed on the terminal with a size t of a reference sub-menu in response to that a display size of the icon symbol of each application is set as a preset visual size, wherein the size of the reference sub-menu is smaller than or equal to a size of the display interface, and the preset visual size is smaller than a size of the application icon;

establishing the application icon selection menu in response to that the overall size m meets the following condition: $n*t \leq m \leq (n+1)*t$, wherein the application icon selection menu comprises n+1 sub-menus, the size of each sub-menu is equal to the size of the reference sub-menu, the icon symbols of all the applications installed on the terminal are sequentially arranged in the n+1 sub-menus, and the n is an integer more than 0; and displaying the first sub-menu in the application icon selection menus on the display interface, and switch the sub-menu displayed on the display interface after receiving a sub-menu switching instruction.

7. The terminal according to claim 6, wherein the moving the certain application icon to the first area based on the selection instruction comprises:

detecting whether any application icon exists in the first area based on the selection instruction;

moving the specified application icon to the first area in response to that no application icon exists in the first area; and in response to that an application icon exists in the first area, moving the application icon in the first area to an area after the first area where no application icon exists, and moving the specified application icon to the first area; or sequentially moving the application icons existing in the first area and the area after the first area backwards and moving the specified application icon to the first area.

8. The terminal according to claim 6, wherein the processor is further configured to:

display sort triggering information after displaying the application icon selection menu, wherein the sort triggering information comprises at least two sort order options;

receive a sort order selection instruction triggered by a selection operation of a user on a specified sort order option;

sort icon symbols of applications in the application icon selection menu based on a sort order corresponding to the specified sort order option; and display the sorted icon symbols of the applications in the application icon selection menu.

9. The terminal according to claim 7, wherein the icon symbol of the application is a thumbnail of the application icon or an application name corresponding to the application icon.

10. The terminal according to claim 6, wherein the long-press operation is a press with a duration longer than a preset duration; and the force touch operation is a touch with a pressure greater than a preset pressure.

11. A non-transitory computer-readable storage medium, wherein in response to that an instruction in the non-transitory computer-readable storage medium is executed by a processor of a terminal, the terminal is configured to:

receive an application icon moving instruction triggered by a user in a first area to which an application icon is to be moved, wherein the first area is an area having at most one application icon and located in one of a plurality of pages of a display interface of a terminal, and the application icon moving instruction is one of a long-press operation and a force touch operation;

displaying an application icon selection menu in a form of a transparent popup window on the display interface in response to the application icon moving instruction, so that all application icons in a page where the first area is located are displayed behind the application icon selection menu and icon symbols of all applications installed on the terminal are displayed in the application icon selection menu;

receiving a selection instruction for an icon symbol of a selected application in the application icon selection menu from the user; and moving an application icon of the selected application to the first area in response to the selection instruction;

wherein the displaying an application icon selection menu on the display interface comprises:

comparing an overall size m of the symbols of all the icon applications installed on the terminal with a size t of a reference sub-menu in response to that a display size of the icon symbol of each application is set as a preset visual size, wherein the size of the reference sub-menu is smaller than or equal to a size of the display interface, and the preset visual size is smaller than a size of the application icon;

establishing the application icon selection menu in response to that the overall size m meets the following condition: $n*t \leq m \leq (n+1)*t$, wherein the application icon selection menu comprises n+1 sub-menus, the size of each sub-menu is equal to the size of the reference sub-menu, the icon symbols of all the applications installed on the terminal are sequentially arranged in the n+1 sub-menus, and the n is an integer more than 0; and displaying the first sub-menu in the application icon selection menus on the display interface, and switch the sub-menu displayed on the display interface after receiving a sub-menu switching instruction.

12. The non-transitory computer-readable storage medium according to claim 11, wherein the moving the certain application icon to the first area based on the selection instruction comprises:

detecting whether any application icon exists in the first area based on the selection instruction;

moving the certain application icon to the first area in response to that no application icon exists in the first area; and in response to that an application icon exists in the first area, moving the application icon in the first area to an area after the first area where no application icons exists, and moving the certain application icon to the first area; or sequentially moving the application icons existing in the first area and the area after the first area backwards and moving the certain application icon to the first area.

13. The non-transitory computer-readable storage medium according to claim 11, wherein the terminal is further configured to:

display sort triggering information after displaying the application icon selection menu, wherein the sort triggering information comprises at least two sort order options;

receive a sort order selection instruction triggered by a selection operation of a user on a certain sort order option;

sort icon symbols of applications in the application icon selection menu based on a sort order corresponding to the certain sort order option; and display the sorted icon symbols of the applications in the application icon selection menu.

14. A mobile terminal implementing the method of claim 1, wherein:

the mobile terminal comprises a display screen having the display interface;

the mobile terminal is configured to, through a selection operation on the application icon selection menu, reduce page-flipping actions and improve efficiency in moving the application icon for a user; and in a case that the application icon selection menu is displayed on a single page of the display interface, the user does not need to flip the page.

\* \* \* \* \*